United States Patent
Uno et al.

(10) Patent No.: US 7,735,335 B2
(45) Date of Patent: Jun. 15, 2010

(54) FLUID PUMP HAVING EXPANSION DEVICE AND RANKINE CYCLE USING THE SAME

(75) Inventors: Keiichi Uno, Kariya (JP); Hironori Asa, Okazaki (JP); Yasuhiro Takeuchi, Kariya (JP); Hiroshi Kishita, Anjo (JP); Kazuhide Uchida, Hamamatsu (JP); Hiroshi Ogawa, Nagoya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 1033 days.

(21) Appl. No.: 11/386,719

(22) Filed: Mar. 23, 2006

(65) Prior Publication Data
US 2006/0213218 A1 Sep. 28, 2006

(30) Foreign Application Priority Data
Mar. 25, 2005 (JP) ............................... 2005/089314

(51) Int. Cl.
F25B 23/00 (2006.01)
(52) U.S. Cl. .......................................... 62/467; 62/501
(58) Field of Classification Search .................. 62/467, 62/501, 238.1; 417/218, 221, 410.5, 199.1; 418/3, 209, 67
See application file for complete search history.

(56) References Cited

U.S. PATENT DOCUMENTS

| 4,222,244 | A | * | 9/1980 | Meckler | 62/235.1 |
| 4,968,222 | A | * | 11/1990 | Gotou et al. | 417/313 |
| 5,054,548 | A | * | 10/1991 | Zohler | 165/133 |
| 5,216,899 | A | * | 6/1993 | Fabris | 62/324.6 |
| 6,599,104 | B2 | * | 7/2003 | Saito et al. | 417/366 |
| 2002/0157414 | A1 | * | 10/2002 | Iwanami et al. | 62/239 |
| 2004/0187506 | A1 | * | 9/2004 | Iwanami et al. | 62/236 |
| 2004/0255591 | A1 | * | 12/2004 | Hisanaga et al. | 60/772 |

FOREIGN PATENT DOCUMENTS

| JP | A59-025097 | | 2/1984 |
| JP | A09-126171 | | 5/1997 |
| JP | 2003138901 A | * | 5/2003 |
| JP | A-2003-138901 | | 5/2003 |
| JP | A-2004-108220 | | 4/2004 |

OTHER PUBLICATIONS

Notice of Official Rejection mailed Dec. 1, 2009 in the corresponding Japanese application No. 2005-089314 (and English translation).

* cited by examiner

Primary Examiner—Cheryl J Tyler
Assistant Examiner—Justin Loffredo
(74) Attorney, Agent, or Firm—Posz Law Group, PLC

(57) ABSTRACT

A complex fluid machine has an expansion-compressor device, a pump, and a motor generator. The expansion-compressor device, the pump, and the motor generator are operatively connected and arranged in series. A portion of an outlet side passage formed in the fluid machine, through which the working fluid flows from the expansion device, is arranged adjacent to a portion of a pump outlet-side passage formed in the fluid machine, through which the working fluid flows from the pump, so that heat of the working fluid in the outlet side passage is transferred to the working fluid in the pump outlet-side passage.

6 Claims, 8 Drawing Sheets

FLUID PUMP HAVING EXPANSION DEVICE AND RANKINE CYCLE USING THE SAME

CROSS REFERENCE TO RELATED APPLICATION

This application is based on Japanese Patent Application No. 2005-089314 filed on Mar. 25, 2005, the disclosure of which is incorporated herein by reference.

FIELD OF THE INVENTION

The present invention relates to a fluid pump having an expansion device and Rankine cycle using such fluid pump, in which the fluid pump for pumping out liquid-phase refrigerant in the Rankine cycle and the expansion device for outputting kinetic energy (mechanical energy) by expansion of super-heated vaporized refrigerant are integrally formed into a single device.

BACKGROUND OF THE INVENTION

A complex fluid machine (a fluid pump having an expansion device) is known in the art, as disclosed in Japanese Patent Publication No. 2004-108220, which is applied to a bottoming cycle (Rankine cycle) power generating system. In such a conventional fluid machine, a turbo pump (fluid pump) for pressurizing liquid phase working fluid, a turbine (expansion device) coaxially connected to the turbo pump for expanding gas phase working fluid which is heated by a heat exchanger, and an electric power generator coaxially connected to the turbo pump for generating the electric power, are integrally formed into one unit, wherein the turbo pump and the electric power generator are driven by rotational force produced by the operation of the turbine.

Although it is disclosed in the above complex fluid machine, that the fluid pump, the expansion device and the electric power generator are integrally formed into one unit, heat transfer of the working fluid flowing in the fluid pump and the expansion device is not considered.

Namely, when the heat of the working fluid at an outlet side of the expansion device is transferred to the working fluid at an inlet side of the fluid pump, the working fluid flowing into the fluid pump is likely to be boiled. When the boiling of the working fluid occurs, the working fluid includes gas phase fluid therein (generation of cavitation), so that volume efficiency of the fluid pump will be decreased.

On the other hand, it is considered to more efficiently operate the Rankine cycle, by transferring the heat of the working fluid at the outlet side of the expansion device (the waste heat remaining in the working fluid even after the expansion) to the working fluid in a heating side (at an outlet side of the fluid pump, at a heating device), so that an amount of super heat for the working fluid is further increased.

SUMMARY OF THE INVENTION

The present invention is made in view of the above problems. And it is, therefore, an object of the present invention to provide a fluid pump having an expansion device, and a Rankine cycle system using such fluid pump, in which high efficiency of the Rankine cycle can be realized.

It is another object of the present invention to provide a fluid pump having an expansion device, and a Rankine cycle system using such fluid pump, in which heat of working fluid at an outlet side of the expansion device (after the expansion) can be transferred to working fluid at an outlet side of the fluid pump.

It is a further object of the present invention to provide a fluid pump having an expansion device, and a Rankine cycle system using such fluid pump, in which heat transfer from working fluid at an outlet side of the expansion device to working fluid at an inlet side of the fluid pump can be suppressed.

It is a still further object of the present invention to provide a fluid pump having an expansion device, and a Rankine cycle system using such fluid pump, in which heat generated at an electrical power generator can be transferred to working fluid at an outlet side of the fluid pump.

It is a still further object of the present invention to provide a fluid pump having an expansion device, and a Rankine cycle system using such fluid pump, which are highly reliable.

According to a feature of the present invention, a fluid machine has a pump (130) for pressurizing and pumping out liquid phase working fluid, and an expansion device (110) connected to the pump in series and for generating a driving force by expansion of the working fluid, which is heated to become gas phase working fluid. In the above fluid machine, a portion of an outlet side passage (131b) formed in the fluid machine (100), through which the working fluid flows from the expansion device (110), is arranged adjacent to a portion of a pump outlet-side passage (131d) formed in the fluid machine (100), through which the working fluid flows from the pump (130), so that heat of the working fluid in the outlet side passage (131b) is transferred to the working fluid in the pump outlet-side passage (131d).

According to the above feature of the present invention, the heat of the refrigerant, which has been expanded and passes through the outlet side passage (131b), can be transmitted to the refrigerant flowing in the pump outlet-side passage (131d). This is because the outlet side passage (131b) and the pump outlet-side passage (131d) are arranged adjacent to each other. This results in that super heated amount of the refrigerant at the inlet side of the expansion-compressor device (110) can be increased, and the work volume at the expansion-compressor device (110) is thereby increased. As a result, the complex fluid machine (100) brings out a high efficiency in the Rankine cycle (40).

According to another feature of the present invention, a fluid machine has an expansion-compressor device (110) for compressing working fluid and pumping out the compressed working fluid when the expansion-compressor device (110) is operated as a compressor device, whereas the expansion-compressor device (110) generates rotational driving force by expanding working fluid when the expansion-compressor device (110) is operated as an expansion device. The fluid machine further has a pump (130) for circulating the working fluid to supply the same into the expansion device (110), and a motor generator (120) having a function of an electric motor and a function of an electric power generator.

The fluid machine further comprises;

a housing (111a, 111, 121, 131, 132) for housing therein the expansion-compressor device (110), the motor generator (120), and the pump (130);

a partitioning wall (131e) for dividing a space defined by the housing into a first space for the expansion-compressor device (110) and the motor generator (120), and a second space for the pump (130);

a low pressure port (131a) provided at the housing (131) and communicated with an inside of the first space;

an outlet side passage (131b) formed in the first space, through which the working fluid from the expansion device (110) flows to the low pressure port (131a);

an outlet opening (131c) provided at the housing (131) and communicated with an inside of the second space; and a pump outlet-side passage (131d) formed in the second space, through which the working fluid from the pump (130) flows to the outlet opening (131c).

In the above fluid machine, the outlet side passage (131b) and the pump outlet-side passage (131d) are respectively formed at each side of the partitioning wall (131e), so that heat of the working fluid in the outlet side passage (131b) is transferred to the working fluid in the pump outlet-side passage (131d) via the partitioning wall (131e), when the expansion-compressor device (110) is operated as the expansion device (110).

According to a further feature of the present invention, the outlet side passage (131b) is formed into a circular shape at one side of the partitioning wall (131e), and the pump outlet-side passage (131d) is formed into a circular shape at the other side of the partitioning wall (131e).

According to a still further feature of the present invention, fins (131f) are formed in the partitioning wall (131e) and arranged in the first space, and the fins (131f) are formed into a circular shape.

According to a still further feature of the present invention, the housing comprises multiple housing parts (111a, 111, 121, 131, 132), and an end housing part (132) and a pump housing part (131) form a pump housing for defining therein the second space together with the partitioning wall (131e). An inlet opening (132c) is formed in the end housing part (132), through which the working fluid is sucked into the pump (130), whereas the outlet opening (131c) is formed in the pump housing part (131). A heat insulating member (160) is provided between the end housing part (132) and the pump housing part (131), so that heat transfer from the working fluid flowing through the pump outlet-side passage (131d) to the working fluid flowing through the inlet opening (132c) is suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

According to the first embodiment, a fluid pump having an expansion device is applied to a complex fluid machine 100, in which a refrigerant pump, the expansion device, an electric rotating device (an electric motor and an electric power generator), and a compressor device are integrally formed into one fluid machine. And the complex fluid machine 100 is applied to a refrigerating apparatus for an automotive vehicle, which has a refrigerating cycle 30 and Rankine cycle 40.

More specifically, an expansion-compressor device 110, a motor generator 120, and a refrigerant pump 130 are integrally formed into the complex fluid machine 100. The expansion-compressor device 110 (the compressor device in the compression mode) is incorporated into the refrigerating cycle 30, whereas the expansion-compressor device 110 (the expansion device in the expansion mode) and the refrigerant pump 130 are incorporated into the Rankine cycle 40. The refrigerating apparatus 1 will be at first explained with reference to FIG. 1.

Figure 1:
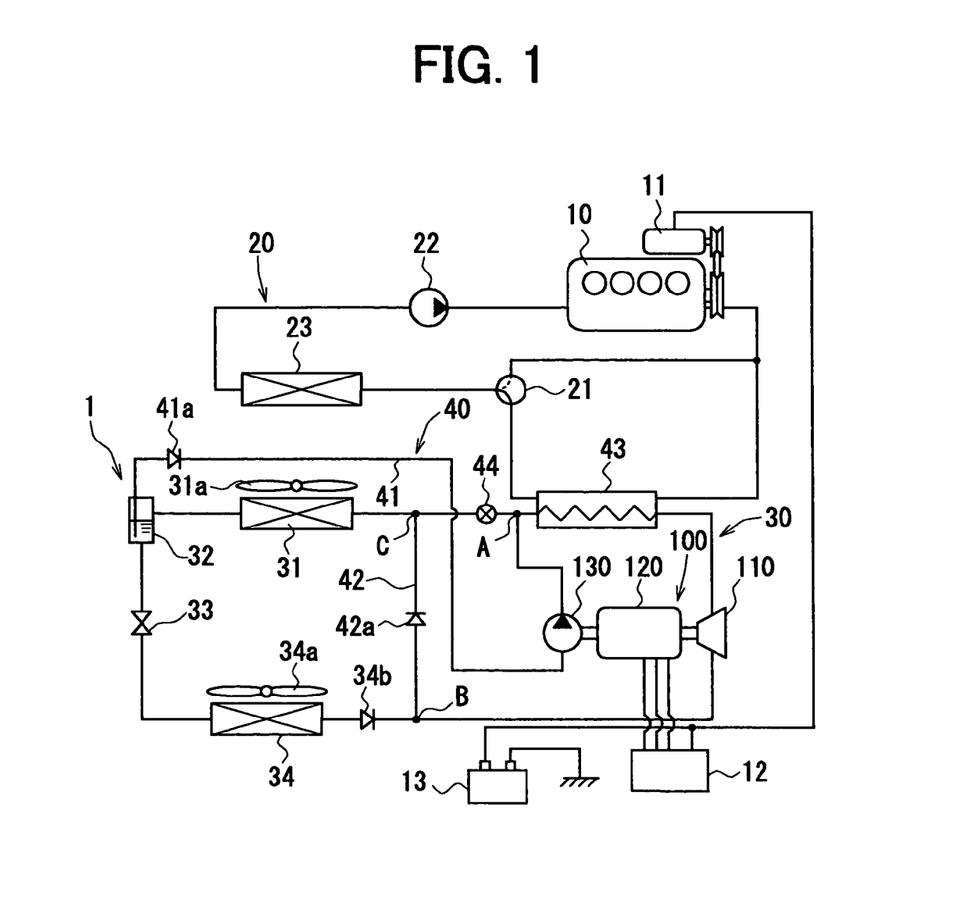
FIG. 1 is a schematic view showing a refrigerating system according to a first embodiment of the present invention.

The refrigerating cycle 30 transfers the heat from a low temperature side to a high temperature side, and utilizes its cold heat and hot heat for an air conditioning operation. The refrigerating cycle 30 comprises the expansion-compressor device 110, a condenser 31, a gas-liquid separator 32, a depressurizing device 33, an evaporator 34 and so on, in which those components are connected in a circuit.

The condenser 31 is a heat exchanger connected at a refrigerant discharge side of the expansion-compressor device 110 in the case of the compression mode, and for cooling down the high pressure and high temperature refrigerant to condense (liquidize) the refrigerant. A condenser fan 31a blows cooling air (outside air) toward the condenser 31.

The gas-liquid separator 32 is a receiver for separating the refrigerant condensed at the condenser 31 into a gas-phase refrigerant and a liquid-phase refrigerant, to flow out the liquid-phase refrigerant. The depressurizing device 33 is a temperature dependent type expansion valve for depressurizing and expanding the liquid-phase refrigerant separated at the gas-liquid separator 32, wherein an opening degree of the valve is controlled so that the refrigerant is depressurized in an isenthalpic manner and that superheated degree of the refrigerant to be sucked into the expansion-compressor device 110 in the compression mode is controlled at a predetermined value.

The evaporator 34 is a heat exchanger for performing a heat absorbing operation by evaporating the refrigerant depressurized by the depressurizing device 33, to cool down air outside of a vehicle (the outside air) or air inside of the vehicle (the inside air), which is blown through the evaporator by a blower fan 34a. A check valve 34b is provided at a refrigerant outlet side of the evaporator 34, for allowing the refrigerant to flow only from the evaporator 34 to the expansion-compressor device 110.

The Rankine cycle 40 collects energy (a driving force at the expansion mode of the expansion-compressor device 110) from waste heat generated at an engine 10 producing a driving power for the vehicle. The condenser 31 is commonly used in both of the refrigerating cycle 30 and the Rankine cycle 40. A first bypass passage 41 is provided between the gas-liquid separator 32 and a juncture A, which is an intermediate point between the condenser 31 and the expansion-compressor device 110, wherein the first bypass passage 41 bypasses the condenser 31. A second bypass passage 42 is provided between junctures B and C, wherein the juncture B is an intermediate point between the expansion-compressor device 110 and the check valve 34b, whereas the juncture C is an intermediate point between the condenser 31 and the juncture A. The Rankine cycle 40 is formed in the following manner.

The refrigerant pump 130 of the complex fluid machine 100 and a check valve 41a are arranged in the first by pass passage 41, wherein the check valve 41a allows the refrigerant to flow only from the gas-liquid separator 32 to the refrigerant pump 130. A heating device 43 is provided between the juncture A and the expansion-compressor device 110.

The heating device 43 is a heat exchanger for heating the refrigerant by heat-exchange between the refrigerant supplied by the refrigerant pump 130 and engine cooling water (hot water) of an engine cooling circuit 20 (hot water circuit) of the engine 10. A three way valve 21 is provided in the hot water circuit 20. A Heating device bypass passage 21a is provided between the three way valve 21 and the engine 10. The three way valve 21 switches from a hot water circulation mode to a water non-circulation mode (a hot water bypass mode), and vice versa, so that the hot water from the engine 10 is controlled to be supplied or not to be supplied to the heating device 43. A switching operation of the three way valve 21 is controlled by an electronic control unit (not shown).

An alternator 11 is provided at the engine 10, wherein the alternator 11 is driven by the engine 10, and the electric power generated at the alternator 11 is charged into a battery 13 through an inverter 12.

A water pump 22, which is, for example, a mechanical pump driven by the engine 10 or an electrical pump driven by an electric motor, is provided in the hot water circuit 20 for circulating the engine cooling water, and a radiator 23 is a heat exchanger for heat-exchanging the engine cooling water with the outside air for cooling down the engine cooling water.

A check valve 42a is provided in the second bypass passage 42 for allowing the refrigerant to flow only from the expansion-compressor device 110 to an inlet side of the condenser 31. An ON-OFF valve 44 is provided in a passage between the junctures A and C. The ON-OFF valve 44 is an electromagnetic valve for opening or closing the passage and is controlled by the electronic control unit (not shown).

The Rankine cycle 40 is formed by the gas-liquid separator 32, the first bypass passage 41, the refrigerant pump 130, the heating device 43, the expansion-compressor device 110, the second bypass passage 42, the condenser 31, and so on.

Figure 2:
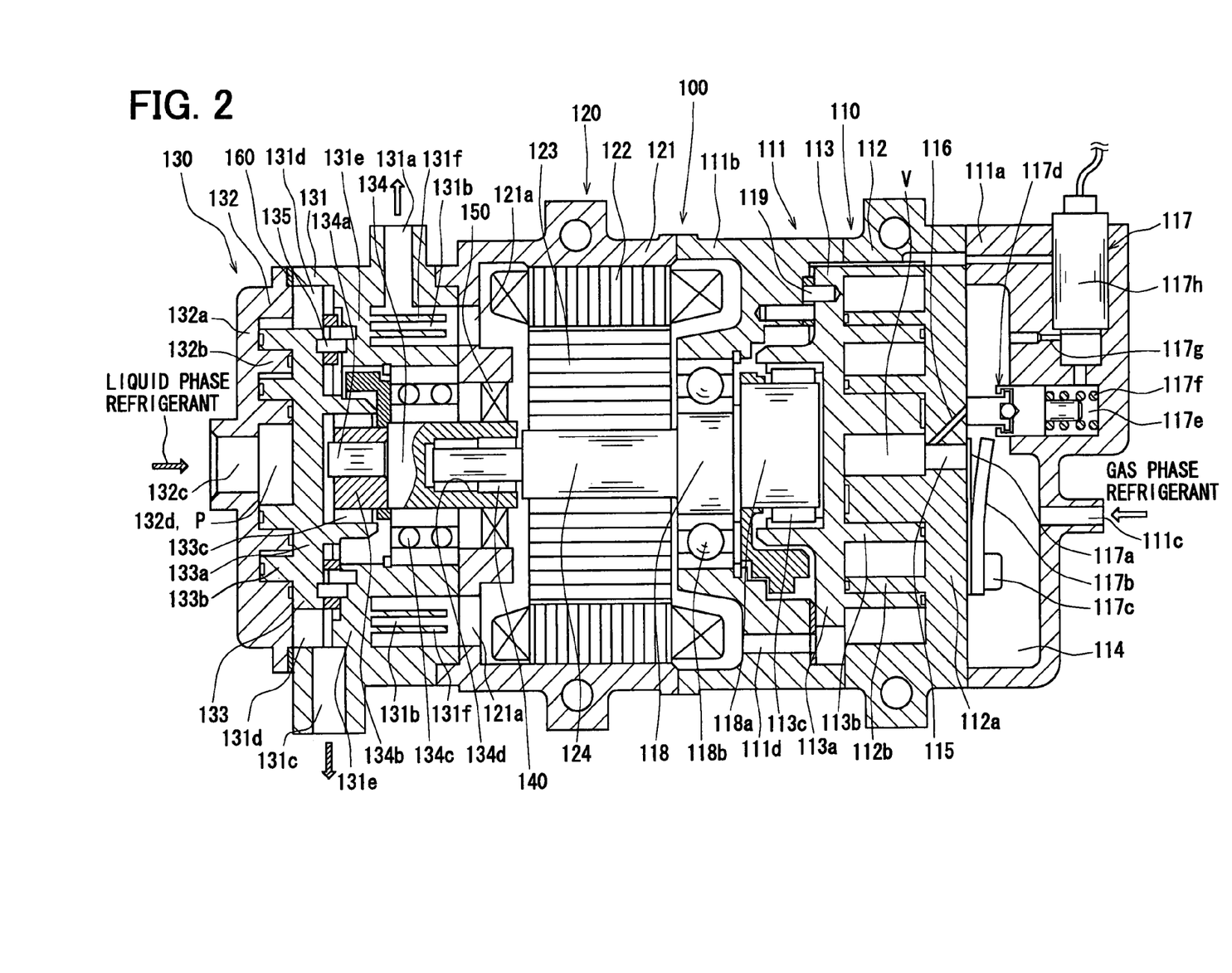
FIG. 2 is a schematic cross sectional view showing a complex fluid machine according to the first embodiment.

Now, a structure of the complex fluid machine 100 will be explained with reference to FIG. 2. As described above, the complex fluid machine 100 comprises the expansion-compressor device 110 having both functions of the compressor device and the expansion device, the motor generator 120 having both functions of the electric power generator and the electric motor, and the refrigerant pump 130.

The expansion-compressor device 110 has the same structure to a well-known scroll type compressor, and comprises a housing 111 for the expansion-compressor device 110, which is composed of a fixed scroll 112 provided between a front housing 111a and a shaft housing 111b. The expansion-compressor device 110 further comprises a movable scroll 113 facing to and rotated with respect to the fixed scroll 112, a discharge port 115 for communicating a working chamber V with a high pressure chamber 114, an inlet port 116, and a valve device 117 for opening and closing the inlet port 116.

The fixed scroll 112 has a base plate 112a and vortical scroll wrap 112b extending from the base plate 112a toward the movable scroll 113, whereas the movable scroll 113 has a vortical scroll wrap 113b to be contacted and engaged with the vortical scroll wrap 112b and a base plate 113a on which the scroll wrap 113b is formed. The working chamber V is formed between the fixed scroll 112 and the movable scroll 113, the scroll wraps 112b and 113b of which are operatively contacted with each other. The volume of the working chamber V is changed (expanded or contracted) when the movable scroll 113 is rotated with respect to the fixed scroll 112 (moves around the fixed scroll).

A shaft 118 is a crank shaft, which is rotationally supported by a bearing 118b fixed to the shaft housing 111b, and which has a crank portion 118a at its one axial end, wherein the crank portion 118a is eccentric with respect to a rotational center of the shaft 118. The crank portion 118a is connected to the movable scroll 113 via a bearing 113c.

A self rotation prevention mechanism 119 is provided between the movable scroll 113 and the shaft housing 111b, so that the movable scroll 113 rotates around the crank portion 118a by one turn when the shaft 118 is rotated by one turn. Namely, the movable scroll 113 is prevented from rotating on its axis but is rotated around the rotational center of the shaft 118 (in an orbital motion). The volume of the working chamber V becomes smaller, as the working chamber is moved from the outside portion of the movable scroll 113 toward its center, when the shaft 118 is rotated in a forward direction. On the other hand, the volume of the working chamber V becomes larger, as the working chamber is moved from its center toward the outside portion of the movable scroll 113, when the shaft 118 is rotated in a reversed direction.

The discharge port 115 is formed at a center portion of the base plate 112a, so that the working chamber V, which has become to its minimum volume when the expansion-compressor device 110 is operated as the compressor device (hereinafter, referred to as a compression mode), is communicated with the high pressure chamber 114 formed in the front housing 111a to discharge (pump out) the compressed refrigerant (the compressed working fluid). The inlet port 116 is likewise formed in the base plate 112a (adjacent to the discharge port 115), to communicate the high pressure chamber 114 with the working chamber V, which has become to its minimum volume when the expansion-compressor device 110 is operated as the expansion device (hereinafter, referred to as an expansion mode), so that high pressure and high temperature refrigerant (i.e. superheated vaporized refrigerant=gas phase working fluid) supplied into the high pressure chamber 114 is introduced into the working chamber V.

The high pressure chamber 114 has a function for smoothing pulsation of the refrigerant pumped out from the discharge port 115, and a high pressure port 111c to be connected to the heating device 43 and the condenser 31 is formed at the high pressure chamber 114.

A low pressure port 131a, which is connected to the evaporator 34 and the second bypass passage 42, is formed in a pump housing 131 for the refrigerant pump 130. The low pressure port 131a is communicated with a low pressure side (an outer peripheral portion) of the fixed and movable scrolls 112 and 113 of the expansion-compressor device 110, through a communication port 111d formed in the shaft housing 111b and other communication ports 121a formed in a motor housing 121, wherein those communication ports 111d and 121a form a part of an outlet side passage 131b for the expansion device. In other words, the outlet side passage 131b is communicated with the low pressure port 131a through the inside of the motor generator 120. More detailed explanation will be made below together with a pump outlet side passage 131d for the refrigerant pump 130.

The valve device 117 comprises a discharge port valve device having a discharge valve 117a, an inlet port valve device having a valve body 117d, an electromagnetic valve 117h, and so on. The discharge valve 117a is arranged in the high pressure chamber 114, and is a check valve of a reed valve shape for preventing the refrigerant pumped out from the discharge port 115 from flowing back from the high pressure chamber 114 into the working chamber V. A stopper 117b is a valve stopping plate for restricting a maximum opening degree of the discharge valve 117a. The discharge valve 117a and the stopper 117b are fixed to the base plate 112a by a bolt 117c.

The valve body 117d is a switching valve for switching from the compression mode to the expansion mode, and vice versa, by opening or closing the inlet port 116. A backward portion of the valve body 117d is slidably inserted into a back pressure chamber 117e formed in the front housing 111a. A spring 117f (a biasing means) is disposed in the inside of the back pressure chamber 117e, for biasing the valve body 117d in a valve closing direction, namely in a direction in which a forward portion of the valve body 117d closes the inlet port 116. An orifice 117g is formed in the front housing 111a, at a passage connecting the back pressure chamber 117e with the high pressure chamber 114, wherein the orifice 117g has a certain flow resistance.

The electromagnetic valve 117h is a control valve for controlling the pressure in the back pressure chamber 117e, by controlling a communication condition between the low pressure side (the low pressure port 131a) and the back pressure chamber 117e. The control valve 117h is operated by an electronic control unit (not shown).

When the electromagnetic valve 117h is opened, the pressure in the back pressure chamber 117e is decreased to become lower than that in the high pressure chamber 114. The valve body 117d is moved in the right hand side of FIG. 2, compressing the spring 117f, to open the inlet port 116. The pressure loss at the orifice 117g is extremely high, and thereby the flow amount of the refrigerant from the high pressure chamber 114 into the back pressure chamber 117e is negligible small.

When the electromagnetic valve 117h is closed, the pressure in the back pressure chamber 117e becomes equal to that of the high pressure chamber 114 through the orifice 117g. Then, the valve body 117d is moved in the left hand direction in FIG. 2 by the spring force of the spring 117f, to close the inlet port 116. As above, the valve body 117d, the back pressure chamber 117e, the spring 117f, the orifice 117g, and the electromagnetic valve 117h form an electrical switching valve of a pilot type, to open and close the inlet port 116.

The motor generator 120 comprises a stator 122 and a rotor 123 rotating in the inside of the stator 122, and is accommodated in the motor housing 121 (in the low pressure space of the fluid machine 100) fixed to the shaft housing 111b. The stator 122 is a stator coil wound with electric wires and is fixed to an inner peripheral surface of the motor housing 121. The rotor 123 is a magnet rotor, in which permanent magnets are provided, and is fixed to a motor shaft 124. One end of the motor shaft 124 is connected to the shaft 118 of the expansion-compressor device 110, and the other end is formed into a small diameter portion, which is operatively connected to a pump shaft 134 for the refrigerant pump 130, as described below.

The motor generator 120 is operated as a motor (the electric motor) for driving the expansion-compressor device 110 (operating as the compressor device), when electric power is supplied from the battery 13 to the stator 122 through the inverter 12 and thereby the rotor 123 is rotated (in the forward direction). The motor generator 120 is also operated as the motor (the electric motor), for driving the refrigerant pump 130, when the rotor 123 is rotated (in the reversed direction), as described below. The motor generator 120 is furthermore operated as a generator (an electric power generator) for generating electric power, when a torque for rotating the rotor 123 (in the reversed direction) is inputted by a driving force produced by the expansion-compressor device 110 in its expansion mode. The electric power thus obtained is charged into the battery 13 through the inverter 12.

The refrigerant pump 130 is arranged at an adjacent position to the motor generator 120, and at the opposite side of the expansion-compressor device 110, and accommodated in the pump housing 131 fixed to the motor housing 121.

A wall portion (a partitioning wall) 131e of the pump housing 131 divides a space defined by a housing of the fluid machine 100 into a first space for the expansion-compressor device 110 and the motor generator 120, and a second space for the refrigerant pump 130. As shown in the drawing, the housing of the fluid machine 100 is formed by the front housing 111a, the outer peripheral portion of the fixed scroll 112, the housing 111 for the expansion-compressor device 110, the motor housing 121, the pump housing 131, and a part of a fixed scroll 132 (which will be described below).

The refrigerant pump 130 comprises, as in the same manner to the expansion-compressor device 110, the fixed scroll 132 having a base plate 132a and a scroll wrap 132b, and a movable scroll 133 having a base plate 133a and a scroll wrap 133b. The fixed scroll 132 is fixed to the pump housing 131 to form an end portion for the refrigerant pump 130, whereas the movable scroll 133 is arranged in the second space defined by the pump housing 131 and the fixed scroll 132. The movable scroll 133 rotates in an orbital motion, and a self rotation on its axis is prevented by a self rotation preventing mechanism 135.

An inlet opening 132c, which is connected to the gas-liquid separator 32, is formed at a center portion of the fixed scroll 132. A pump inlet-side passage 132d (a working chamber P) is formed between the scroll wraps 132b, 133b of the fixed and movable scrolls 132 and 133, whereas a pump outlet-side passage 131d of a circular shape is formed between an inner peripheral surface of the pump housing 131 and an outer peripheral surface of the movable scroll 133. An outlet opening 131c is formed in the pump housing 131, which outwardly extends in an opposite direction to that of the low pressure port 131a. The inlet opening 132c, the pump inlet-side passage 132d, the pump outlet-side passage 131d, and the outlet opening 131c are communicated in this order, and the outlet opening 131c is connected to the heating device 43.

The pump shaft 134 is rotationally supported by a bearing 134c fixed to the pump housing 131, and has a crank portion 134a at its one axial end, wherein the crank portion 134a is eccentric with respect to a rotational center of the pump shaft 134. The crank portion 134a is connected to the movable scroll 133 via a bushing 134b and a bearing 133c. The other axial end of the pump shaft 134 is formed with a hole portion 134d, into which the small diameter portion of the motor shaft 124 is inserted. A one way clutch 140 is provided between the motor shaft 124 and the pump shaft 134. The one way clutch 140 becomes out of engagement from the pump shaft 134, when the motor shaft 124 is rotated in the forward direction, to disconnect the pump shaft 134 from the motor shaft 124 (not to rotate the pump shaft 134). On the other hand, when the motor shaft 124 is rotated in the reversed direction, the motor shaft 124 is brought into the engagement with the pump shaft 134, to rotate the same.

A shaft seal member 150 is provided between the motor housing 121 and the pump shaft 134, to seal the inner space of the motor generator 120 (the first space of the fluid machine) from the refrigerant pump 130 (a par of the second space of the high pressure side, which is communicated with the pump outlet-side passage 131c).

According to the above complex fluid machine 100, it is characterized in arrangements of the outlet side passage 131*b* for the expansion-compressor device 110, the pump inlet-side passage 132*d* and the pump outlet-side passage 131*d* for the refrigerant pump 130.

Namely, the low pressure port 131*a* and the pump outlet-side passage 131*c* are formed in the pump housing 131, and the pump outlet-side passage 131*d* for the refrigerant pump 130 is arranged at a side, which is closer to the expansion-compressor device 110 (the motor generator 120) than the pump inlet-side passage 132*d*. Accordingly, a portion of the outlet side passage 131*b* for the expansion device 110 is arranged adjacent to a portion of the pump outlet-side passage 131*d*, and the outlet side passage 131*b* for the expansion device 110 is arranged at such a position which is separated from the pump inlet-side passage 132*d* via the pump outlet-side passage 131*d*.

The outlet side passage 131*b* is formed into a circular shape, between the communication ports 121*a* and the low pressure port 131*a*, corresponding to the circular shaped pump outlet-side passage 131*d*. Multiple fins 131*f* are provided on a wall portion 131*e* of the pump housing 131, so that the fins 131*f* are formed into the circular shape and arranged in the circular shaped outlet side passage 131*b*. The wall portion 131*e* separates the space for the pump outlet-side passage 131*d* from the space for the outlet side passage 131*b*. The fins 131*f* are provided for increasing surface area of the wall portion 131*e*.

A heat insulating member (a gasket) 160 is provided between the pump outlet-side passage 131*d* and the pump inlet-side passage 132*d*, more specifically, between the pump housing 131 and the fixed scroll 132. The gasket 160 is made of rubber, resin or the like, having a lower heat conductivity than a metal (e.g. aluminum) forming the fixed scroll 132.

An operation and advantages of the complex fluid machine 100 according to the above embodiment will be explained below.

(Compression Mode)

In the compression mode, the motor generator 120 is operated as the electric motor when a cooling operation by the refrigerating cycle is necessary. A rotational force is applied to the motor shaft 124 (in the forward direction) to rotate the movable scroll 113 of the expansion-compressor device 110, so that the refrigerant is sucked and compressed in the refrigerating cycle.

More specifically, the ON-OFF valve 44 is opened by the control unit (not shown) and the engine cooling water is prevented by the three way valve 21 from flowing into the heating device 43. The electromagnetic valve 117*h* is closed to close the inlet port 116 by the valve body 117*d*, and the electric power is supplied to the stator 122 of the motor generator 120 from the battery 13 through the inverter 12 to rotate the motor shaft 124.

During this operation, as in the same manner to the well known scroll type compressor, the expansion-compressor device 110 sucks the refrigerant from the low pressure port 131*a* (through the outlet side passage 131*b*), compresses the same in the working chamber V, pumps out the compressed refrigerant from the discharge port 115 into the high pressure chamber 114, and discharges the compressed refrigerant from the high pressure port 111*c* to the condenser 31.

The refrigerant discharged from the high pressure port 111*c* is circulated in the refrigerating cycle 30 of the heating device 43, the ON-OFF valve 44, the condenser 31, the gas-liquid separator 32, depressurizing device 33, the evaporator 34, the check valve 34*b*, the low pressure port 131*a* of the expansion-compressor device 110, so that the cooling operation is performed by the heat absorbing operation at the evaporator 34. Since the engine cooling water (the hot water) does not flow into the heating device 43, the refrigerant is not heated in the heating device 43, and thereby the heating device 43 operates simply as a part of the refrigerant passage.

Since the pump shaft 134 for the refrigerant pump 130 becomes out of the engagement from the motor shaft 124 because of the one way clutch 140, the refrigerant pump 130 is not operated in this mode, namely refrigerant pump 130 does not act as operating resistance. The working fluid (the refrigerant) in the refrigerant pump 130 is cooled down by the low temperature and low pressure refrigerant from the low pressure port 131*a*.

(Expansion Mode)

In the expansion mode, the high pressure super heated refrigerant heated by the heating device 43 is supplied into the expansion-compressor device 110 to expand the refrigerant in the expansion device 110, when the cooling operation by the refrigerating cycle 30 is not necessary and when a sufficient waste heat can be obtained from the engine 10 (when the temperature of the engine cooling water is sufficiently high). The movable scroll 113 is rotated by the expansion of the refrigerant to obtain a driving force (mechanical energy) for rotating the motor shaft 124. The rotor 123 of the motor generator 120 is rotated by thus obtained driving force, to generate the electric power, and to charge the generated electric power into the battery 13.

More specifically, the ON-OFF valve 44 is closed by the control unit (not shown) and the engine cooling water is circulated by the three way valve 21 to flow into the heating device 43. The motor generator 120 is operated as the electric power generator (rotation in the reversed direction) and the electromagnetic valve 117*h* is opened to open the inlet port 116 by the valve body 117*d*.

In this operation, the pump shaft 134 of the refrigerant pump 130 is brought into the engagement with the motor shaft 124 through the one way clutch 140, so that the refrigerant pump 130 is driven to rotate. The high pressure super heated refrigerant heated by the heating device 43 is supplied into the working chamber V through the high pressure port 111*c*, the high pressure chamber 114, and the inlet port 116, so that the refrigerant is expanded in the working chamber V. The movable scroll 113 is rotated by the expansion of the refrigerant in the reversed direction opposite to that in the compression mode, the rotational driving force applied to the shaft 118 is transmitted to the motor shaft 124 and the rotor 123 of the motor generator 120. When the driving force transmitted to the motor shaft 124 becomes higher than a driving force necessary for the refrigerant pump 130, the motor generator starts its rotation as the electric power generator. And the obtained electric power is charged into the battery 13 through the inverter 12.

The refrigerant, the pressure of which is decreased as a result of the expansion, flows out from the low pressure port 131*a* through the outlet side passage 131*b*. The refrigerant flowing out from the low pressure port 131*a* is circulated in the Rankine cycle 40, which comprises the second bypass passage 42, the check valve 42*a*, the condenser 31, the gas-liquid separator 32, the first bypass passage 41, the check valve 41*a*, the refrigerant pump 130 (the inlet opening 132*c*, the pump inlet-side passage 132*d*, the pump outlet-side passage 131*d*, and the outlet opening 131*c*), the heating device 43 and the expansion-compressor device 110 (the high pressure port 111*c*). The refrigerant pump 130 supplies the liquid-phase refrigerant from the gas-liquid separator 32 to the heating device 43, wherein the refrigerant is pressurized to such a pressure corresponding to the temperature of the superheated vaporized refrigerant produced at the heating device 43.

In the circulation of the refrigerant, the heat of the refrigerant passing through the outlet side passage 131b for the expansion device 110 is transmitted to the refrigerant flowing in the pump outlet-side passage 131d, via the fins 131f and the wall portion 131e. In other words, the transmission of the heat from the refrigerant flowing in the outlet side passage 131b to the refrigerant passing through the pump inlet-side passage 132d is suppressed. Furthermore, the transmission of the heat from the refrigerant flowing in the pump outlet-side passage 131d to the refrigerant passing through the pump inlet-side passage 132d is suppressed by the gasket 160.

In the above operation of the expansion mode, in which the cooling operation is not necessary and the sufficient amount of the waste heat can be obtained from the engine 10, the motor generator 120 is operated as the generator to generate the electrical power, so that the waste heat energy is collected as the electrical energy. In this operation, the driving force for driving the alternator 11 can be reduced, so that fuel consumption ratio for the engine 10 can be improved. Furthermore, since the refrigerant pump 130 is driven by the output power of the expansion device 110, a driving source for exclusively driving the refrigerant pump 130 can be eliminated.

In the operation of the compression mode, the motor generator 120 is operated as the electric motor, whether or not there is the sufficient waste heat from the engine 10, so that the expansion-compressor device 110 is operated as the compressor device. Since the expansion-compressor device 110 is operated as the compressor device, the expansion device may not act as a resistance against the operation of the motor generator 120.

The heat of the refrigerant, which has been expanded and passes through the outlet side passage 131b, can be transmitted to the refrigerant flowing in the pump outlet-side passage 131d, as described above. This is because the outlet side passage 131b and the pump outlet-side passage 131d are arranged adjacent to each other. This means that super heated amount of the refrigerant at the inlet side (the side of the heating device 43) of the expansion-compressor device 110 can be increased, and the work volume at the expansion-compressor device 110 is thereby increased. As a result, the complex fluid machine 100 brings out a high efficiency in the Rankine cycle 40.

As is also explained above, the transmission of the heat from the refrigerant flowing in the outlet side passage 131b to the refrigerant passing through the pump inlet-side passage 132d is suppressed. This results in that the refrigerant flowing into the refrigerant pump 130 is prevented from being boiled and volume efficiency can be increased.

The refrigerant pump 130 is formed as the scroll type pump, in which the refrigerant is sucked into the pump from its center portion and pumps out the refrigerant from its outer peripheral portion, and the pump outlet-side passage 131d is arranged on the side to the expansion-compressor device 110. Accordingly, the outlet side passage 131b and the pump outlet-side passage 131d can be arranged adjacent to each other.

The portion of the outlet side passage 131b and the pump outlet-side passage 131d are formed into the circular shape and both of them are arranged adjacent to each other. This means that each length of the passages 131b and 131d can be made longer and the amount of the heat transfer from the refrigerant passing through the outlet side passage 131b to the refrigerant flowing in the pump outlet-side passage 131d can be increased.

Furthermore, since the fins 131f are provided at the wall portion 131e (which separates the portion of the outlet side passage 131b from the pump outlet-side passage 131d), the surface area of the wall portion 131e is increased. This also increases the amount of the heat transfer from the refrigerant passing through the outlet side passage 131b to the refrigerant flowing in the pump outlet-side passage 131d. The fins 131f are provided in a space covering almost all area of the circular shaped outlet side passage 131b. This further increases the amount of the heat transfer.

The gasket 160 (as the heat insulating member) is provided between the pump outlet-side passage 131d and the pump inlet-side passage 132d. This means that the heat transfer from the refrigerant flowing in the outlet side passage 131b to the refrigerant passing through the pump inlet-side passage 132d is suppressed and that the refrigerant flowing into the refrigerant pump 130 is thereby prevented from being boiled and the volume efficiency can be increased.

A part of the outlet side passage 131b is formed within the inside space of the motor generator 120, so that the motor generator 120 may be cooled down by the refrigerant from the expansion-compressor device 110. As a result, the reliability of the motor generator 120 can be increased. The heat, which is absorbed from the motor generator 120 by the refrigerant passing through the motor generator 120, can be additionally transferred to the refrigerant flowing through the pump outlet-side passage 131d. This means that super heated amount of the refrigerant at the inlet side (the side of the heating device 43) of the expansion-compressor device 110 can be increased, and the work volume at the expansion-compressor device 110 is thereby increased.

In the case that the temperature of the refrigerant at the pump inlet-side passage 132d is high (the temperature is high so that gas phase refrigerant may be included) after the engine operation has been started, and the cavitation is thereby caused in the refrigerant pump 130, the operation of the Rankine cycle 40 can not be smoothly started. In such a case, the refrigerating cycle 30 is operated for a certain period of time, namely the expansion-compressor device 110 is operated as the compressor device, so that the low temperature and low pressure refrigerant is sucked into the compressor device from the low pressure port 131a. As a result, the refrigerant in the pump inlet-side passage 132d is cooled down.

Furthermore, in the case that the temperature of the refrigerant at the pump inlet-side passage 132d becomes high during the operation of the Rankine cycle 40, and the cavitation may be caused in the refrigerant pump 130, the refrigerating cycle 30 is likewise operated for the certain period of time,

Second Embodiment

Figure 3:
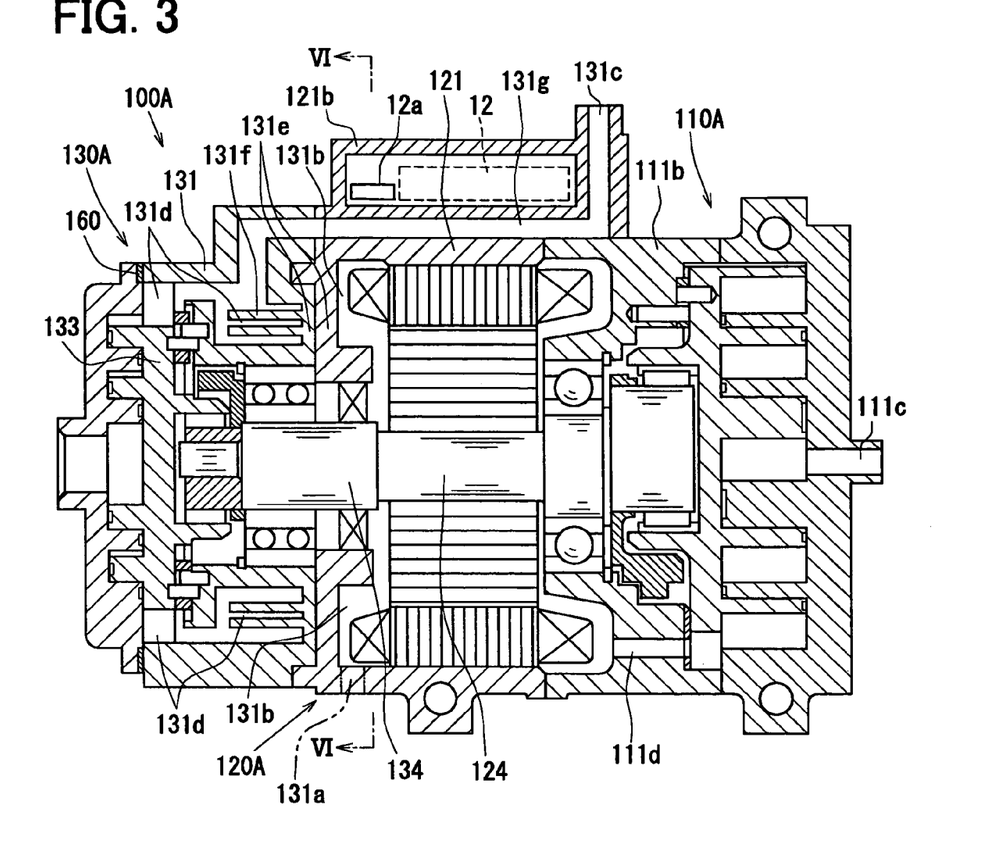
FIG. 3 is a schematic cross sectional view showing a complex fluid machine according to a second embodiment.
Figure 4:
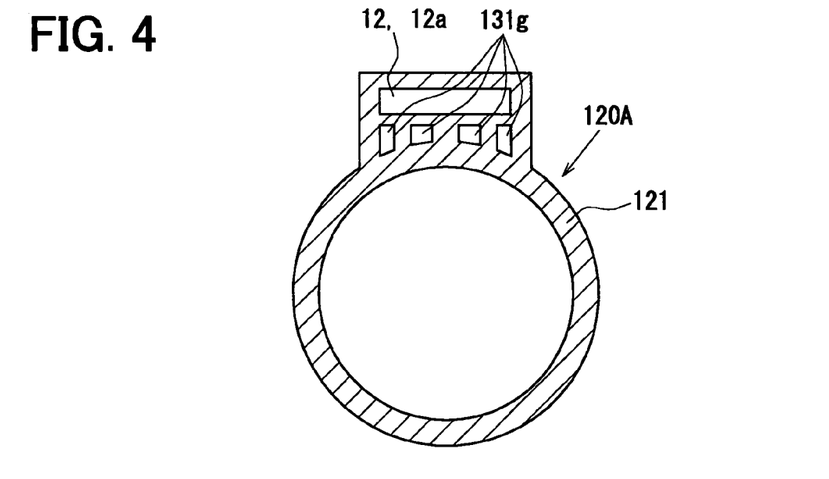
FIG. 4 is a schematic cross sectional view taken along a line IV-IV in FIG. 3.

A second embodiment of the present invention is shown in FIGS. 3 and 4. According to the second embodiment, the refrigerating cycle 30 is eliminated from the refrigerating apparatus 1, and an expansion device 110A is provided in a complex fluid machine 100A, in which the expansion device 110A is exclusively operated as the expansion device. The inverter 12 is integrally formed in a motor generator 120A. A configuration of the pump outlet-side passage 131d is modified.

A casing 121b for the inverter 12 is formed at an outer peripheral portion of the motor housing 121. Switching devices 12a, which mostly generate heat among elements of the inverter 12, are arranged at such portion of the casing 121b, which is close to the pump outlet-side passage 131d.

In the expansion device 110A, the valve device 117 (the discharge valve 117a, the valve body 117d, the electromagnetic valve 117h, and so on), the inlet port 116 and so on are eliminated, when compared with the expansion-compressor device 110 of the first embodiment. A discharge port of the expansion device 110A is formed as the high pressure port 111c.

The outlet side passage 131b is formed into the circular shape at a side to the refrigerant pump 130A, wherein the outlet side passage 131b is communicated with the expansion device 110A through the inside space of the motor housing 121 and the communication port 111d. The outlet side passage 131b is further communicated with the low pressure port 131a formed in the motor housing 121, as indicated by a two-dot chain line in FIG. 3.

The pump outlet-side passage 131d for the refrigerant pump 130A is formed into the circular shape at a side opposite to the fixed scroll and around an outer peripheral portion of the movable scroll. The pump outlet-side passage 131d is communicated with the outlet opening 131c through multiple passages 131g formed at the outer peripheral side of the motor housing 121 and between the motor housing 121 and the inverter 12 (the switching devices 12a).

The wall portion 131e, which is formed by a part of the motor housing 121 and a part of the pump housing 131, separates the circular shaped outlet side passage 131b from the circular shaped pump outlet-side passage 131d. A thickness of the wall portion 131e is made to be as small as possible. The wall portion 131e of the pump housing 131 is formed with multiple fins 131f, which are arranged in the pump outlet-side passage 131d.

Since the expansion device 110A is formed as having the single function of the expansion operation, a means (corresponding to the one way clutch 140 in the first embodiment) for connecting or disconnecting the motor generator 120A with or from the refrigerant pump 130A is not necessary. The motor shaft 124 is, therefore, directly connected with the pump shaft 134.

According to the second embodiment, although the refrigerating operation by the refrigerating cycle (30) can not be performed, the motor generator 120A is operated by the driving force produced at the expansion device 110A as the generator for generating the electrical power. The refrigerant pump 130A is likewise operated by the expansion device 110A.

According to the second embodiment, the heat of the refrigerant passing through the outlet side passage 131b as well as the heat from the inverter 12 (the switching devices 12a) can be effectively transmitted to the refrigerant flowing through the pump outlet-side passage 131d. This means that super heated amount of the refrigerant at the inlet side (the side of the heating device 43) of the expansion device 110A can be increased, and the work volume at the expansion device 110A is thereby increased. As a result, the complex fluid machine 100A brings out a high efficiency in the Rankine cycle 40. Further, the inverter 12 is cooled down by the refrigerant and thereby the reliability of the inverter 12 can be increased.

Third Embodiment

Figure 5:
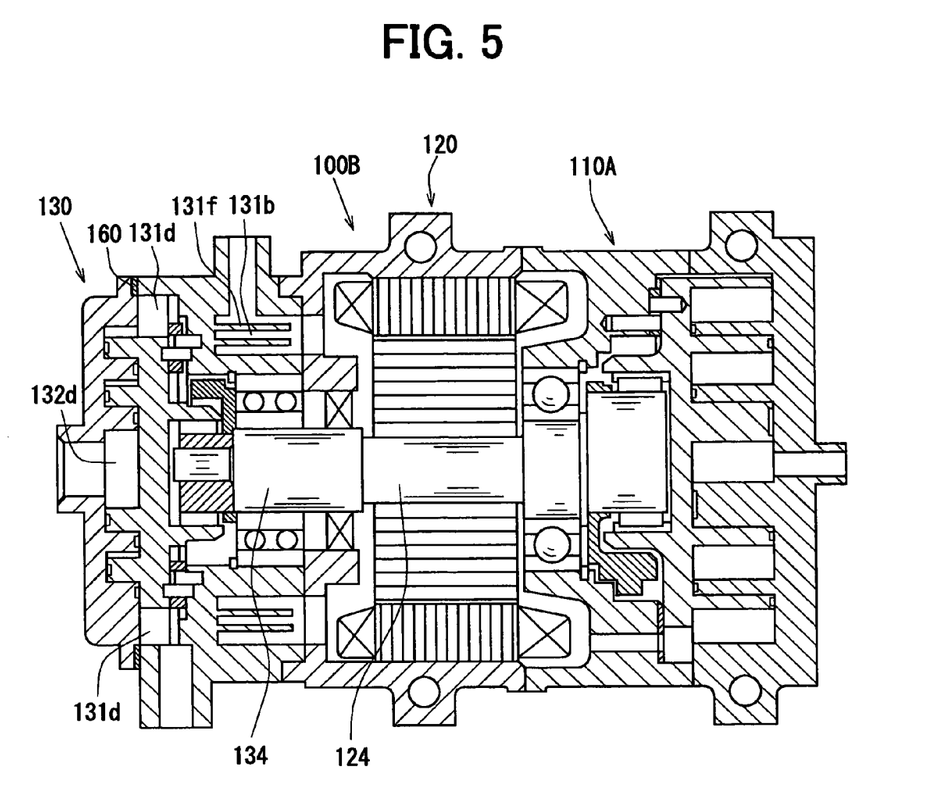
FIG. 5 is a schematic cross sectional view showing a complex fluid machine according to a third embodiment.

A third embodiment of the present invention is shown in FIG. 5, in which the refrigerating cycle 30 is also eliminated and an expansion device 110A is provided in a complex fluid machine 100B (in the same manner to the second embodiment). Furthermore, the motor generator 120 and the refrigerant pump 130 are directly connected, namely the motor shaft 124 is directly connected to the pump shaft 134 and the one way clutch 140 of the first embodiment is eliminated.

The refrigerating operation can not be performed in this third embodiment, either, in the same manner to the second embodiment. The operation of the Rankine cycle 40 and the advantages are the same to the first embodiment.

Fourth Embodiment

Figure 6:
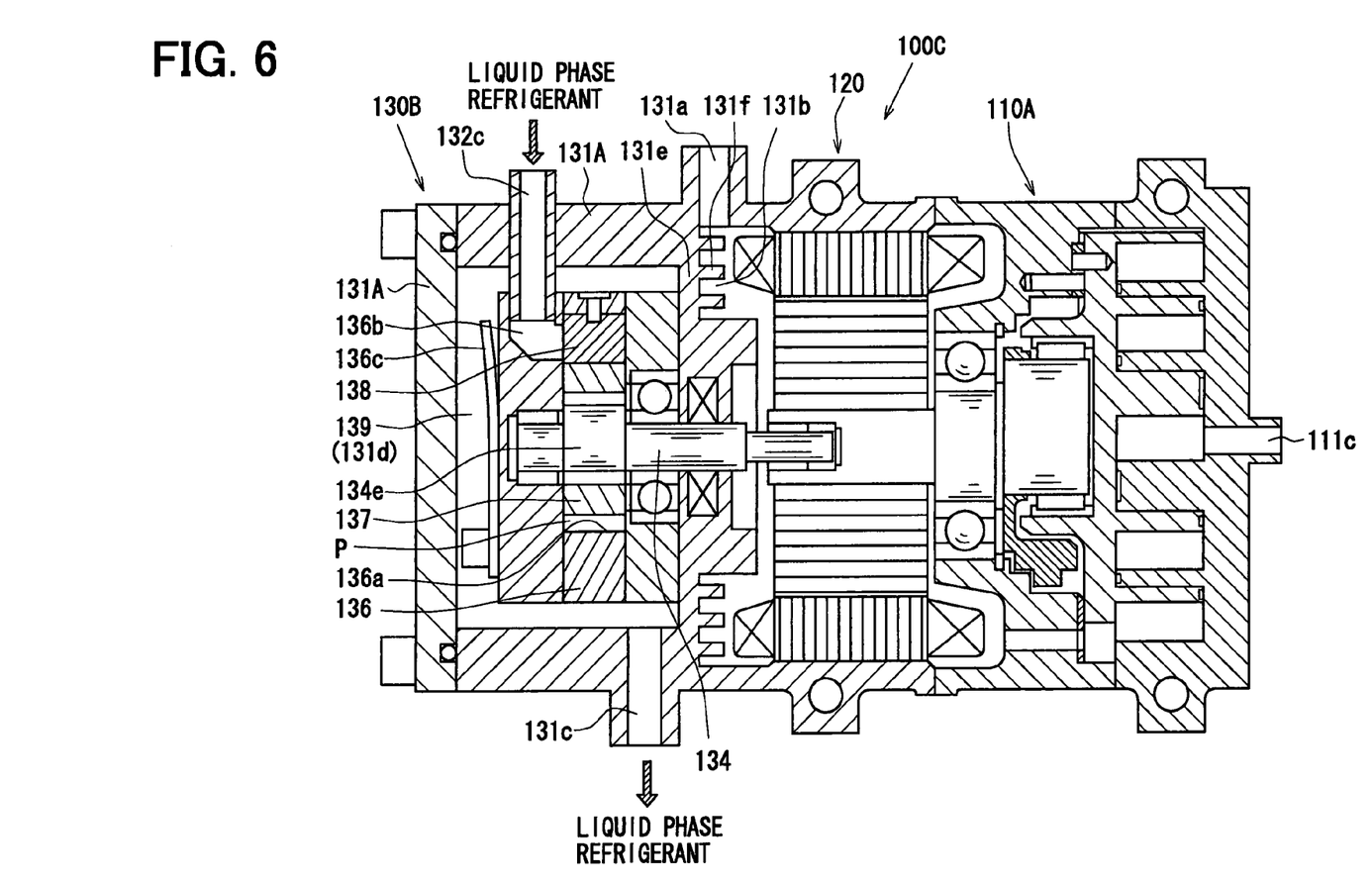
FIG. 6 is a schematic cross sectional view showing a complex fluid machine according to a fourth embodiment.

A fourth embodiment of the present invention is shown in FIG. 6, in which the refrigerating cycle 30 is likewise eliminated and the expansion device 110A is provided in a complex fluid machine 100C (in the same manner to the second embodiment). A refrigerant pump 130B is formed as a rolling piston type pump, instead of the scroll type pump.

The refrigerant pump 130B comprises a cylinder 136a, a rotor 137 and so on formed in the inside of the pump housing 131A. The cylinder 136a is formed as a circular shape at a center portion of a cylinder block 136. A cam portion 134e of a circular shape is formed on the pump shaft 134, wherein the cam portion 134e is eccentric with respect to the pump shaft 134. The rotor 137 of a ring shape is arranged at an outer periphery of the cam portion 134e. An outer diameter of the rotor 137 is made smaller than an inner diameter of the cylinder 136a, so that the rotor 137 is accommodated within a space defined by the cylinder 136a. The rotor 137 moves around the pump shaft 134 within the space defined by the cylinder 136a, corresponding to the rotation of the cam portion 134e. A vane 138 is slidably inserted into a slot formed in the rotor 137, so that the vane 138 moves in a radial direction. A space defined by the rotor 137 and the vane 138 within the cylinder 136a is formed as a pump working chamber P.

A refrigerant inlet port 136b and a refrigerant outlet port (not shown) are formed in the cylinder block 136. The inlet port 136b is communicated with the inlet opening 132c, whereas the outlet port (not shown) is communicated via a discharge valve 136c with a high pressure chamber 139, which is formed by the pump housing 131A and the cylinder block 136. The high pressure chamber 139 is connected with the outlet opening 131c, which is formed in the pump housing 131A at such a position close to the motor generator 120.

According to the refrigerant pump 130B of this embodiment, parts and components forming the pump working chamber P are surrounded by the atmosphere of the high pressure chamber 139, which is separated from the atmospheric air side by the pump housing 131A. The high pressure chamber 139 forms a part of the pump outlet-side passage 131d, and the portion of the pump outlet-side passage 131d is arranged adjacent to a portion of the outlet side passage 131b for the expansion device 110A.

According to the refrigerant pump 130B, the refrigerant flows into the pump working chamber P through the inlet opening 132c and the inlet port 136b, when the rotor 137 is rotated around the pump shaft 134, and the refrigerant is pumped out from the outlet opening 131c through the outlet port (not shown), the discharge valve 136c and the high pressure chamber 139.

As above, the heat of the refrigerant passing through the outlet side passage 131b of the expansion device 110A can be transmitted to the refrigerant flowing through the high pressure chamber 139 (the pump outlet-side passage 131d) of the refrigerant pump 130B. This means that super heated amount of the refrigerant at the inlet side (the side of the heating device 43) of the expansion device 110A can be increased, and the work volume at the expansion device 110A is thereby increased. As a result, the complex fluid machine 100C brings out a high efficiency in the Rankine cycle 40. Furthermore, the outlet opening 131c is provided at the position close to the motor generator 120, the refrigerant flowing through the outlet opening 131c can be also effectively heated by the refrigerant passing through the outlet side passage 131b of the expansion device 110A. Since the heat transfer from the refrigerant in the side of the expansion device 110A to the refrigerant flowing through the pump working chamber P is suppressed by the high pressure chamber 139 of the refrigerant pump 130B, the refrigerant flowing into the refrigerant pump 130B is prevented from being boiled and the volume efficiency thereof can be increased.

Figure 7:
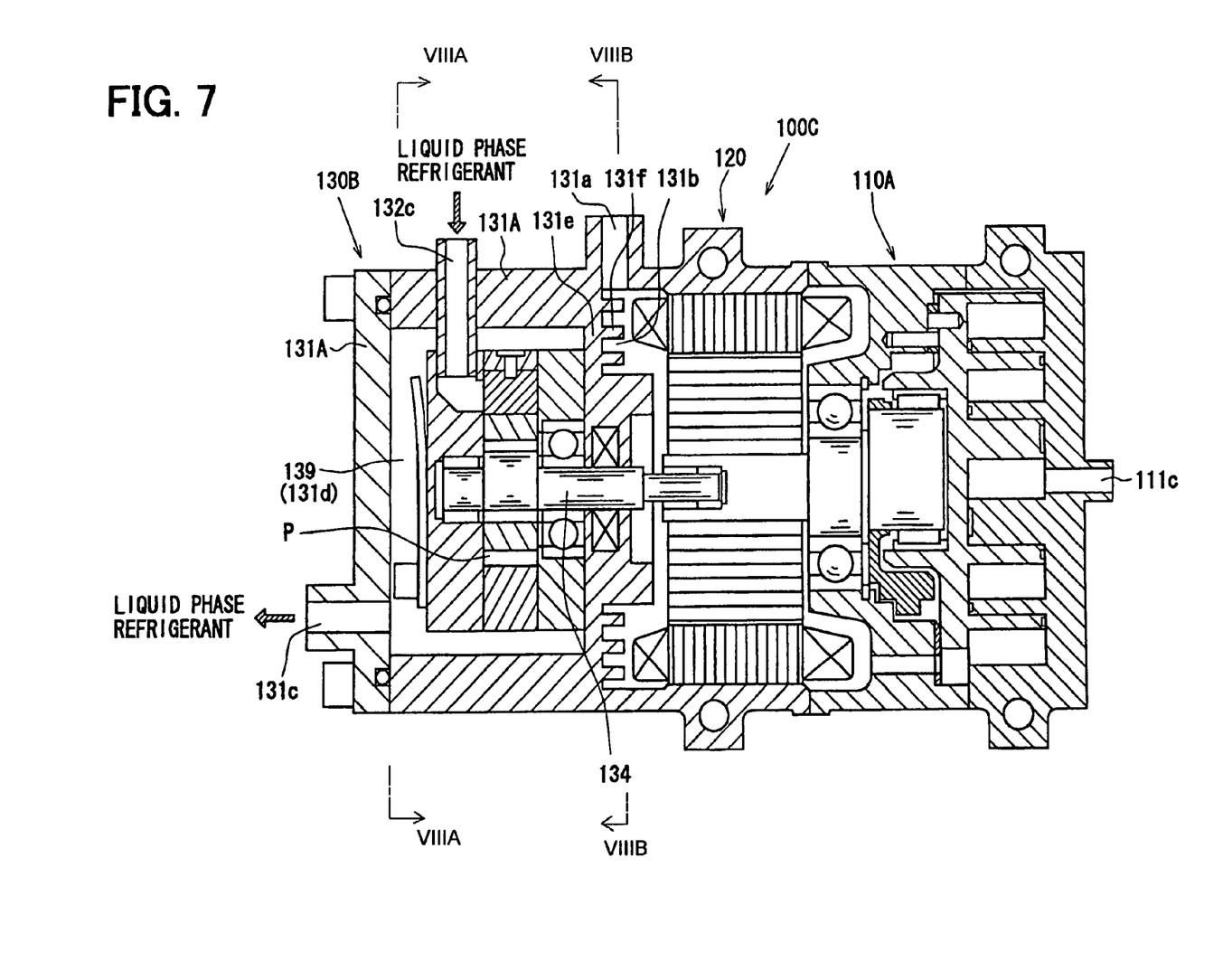
FIG. 7 is a schematic cross sectional view showing a variation of the complex fluid machine according to the fourth embodiment.
Figure 8A:
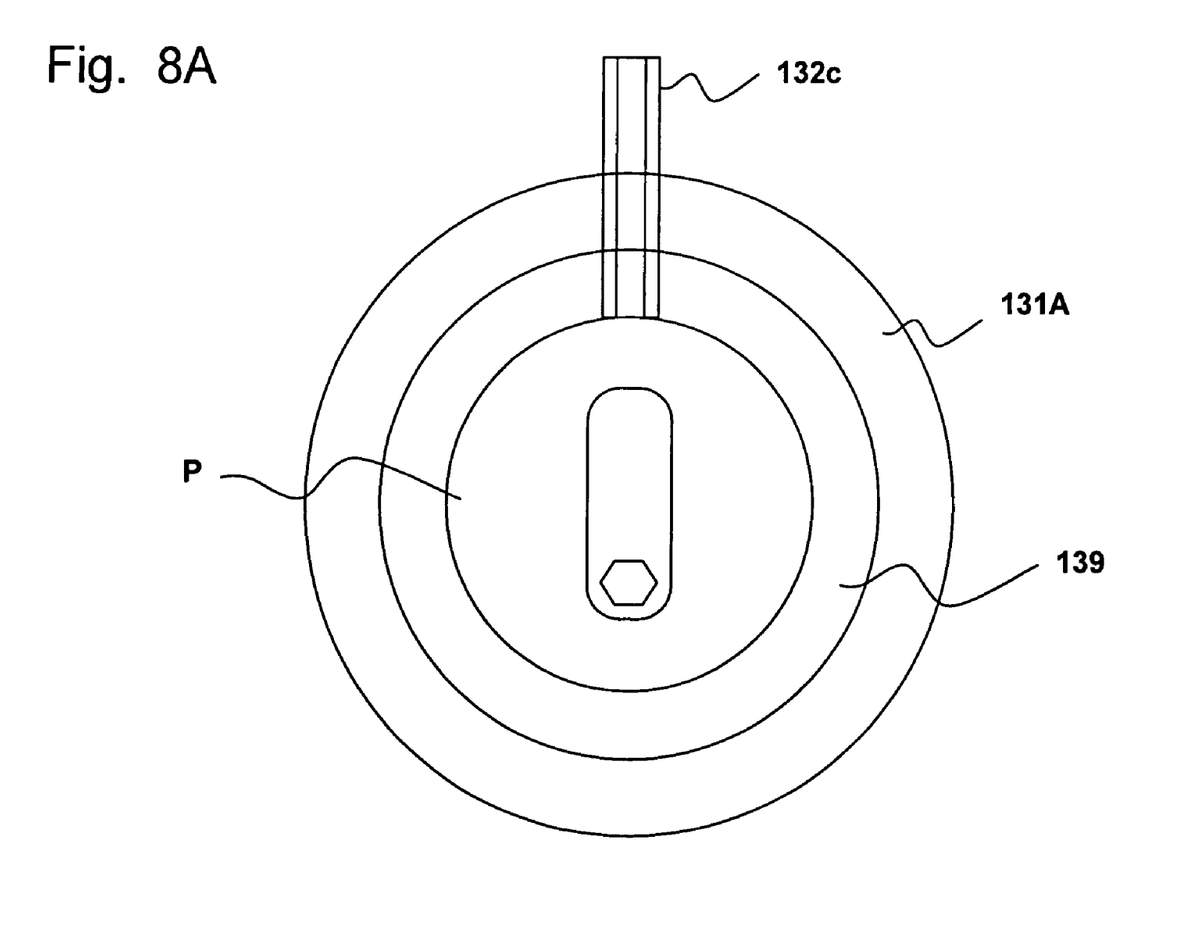
FIG. 8A is a schematic end view of the pump as seen in the direction indicated by lines VIIIA-VIIIA in FIG. 7.
Figure 8B:
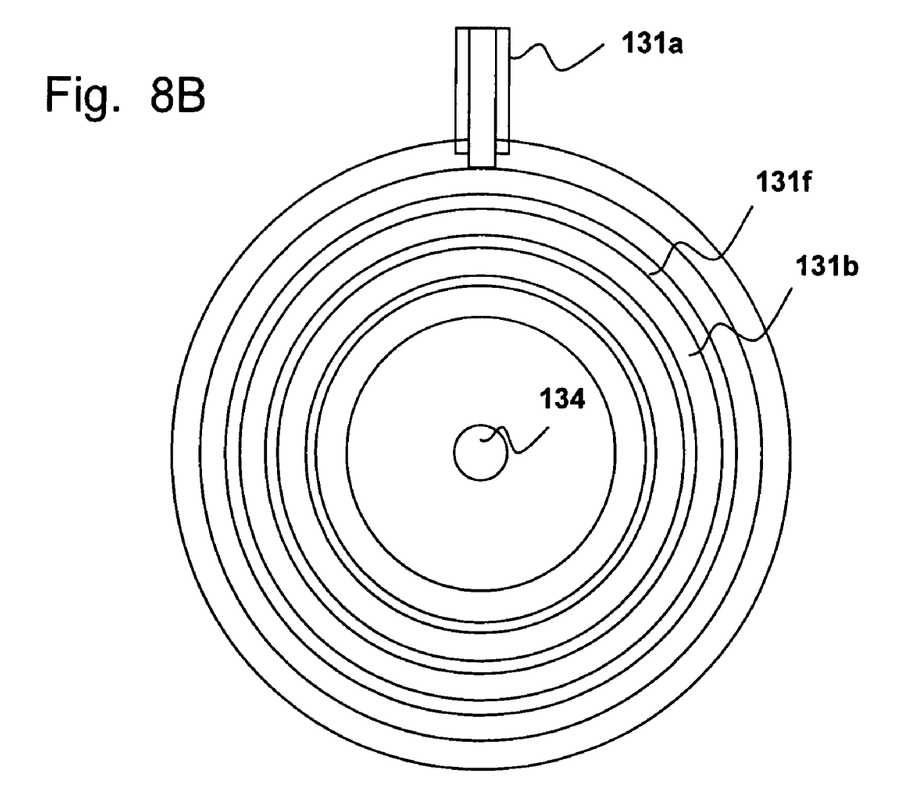
FIG. 8B is a schematic end view of the pump as seen in the direction indicated by lines VIIIB-VIIIB in FIG. 7.

A variation of the fourth embodiment is shown in FIG. 7, wherein the outlet side opening 131c is provided at an axial end of the pump housing 131A.

(Further Modifications)

The scroll type or rolling piston type refrigerant pump 130, 130A, 130B is applied to the complex fluid machine in the above embodiments. Other types of the pumps, such as gear type, trochoid type, or the like, can be used in the present invention. This can be also applied to the type of the expansion-compressor device 110 or the expansion device 110A.

The inside space of the motor generator 120 can be filled with the refrigerant pumped out from the refrigerant pump 130. In such a case, the expansion-compressor device is hydraulically separated from the motor generator, for example, a shaft seal device is provided between the expansion-compressor device 110 (or the expansion device 110A) and the motor generator 120.

In the above embodiments, the engine 10 for the automotive vehicle is explained as the heat generating device. However, an external combustion engine, fuel cell stacks for fuel-cell cars, various kinds of motors, inverters, and the like, which generate heat during their operations, wherein the heat would be thrown away as the waste heat, can be used as the heat generating device.

What is claimed is:

1. A complex fluid machine which is applied to a Rankine cycle having a heat generating source, the fluid machine comprising:

an expansion device for generating rotational driving force by expanding working fluid;

a pump for circulating the working fluid to supply the same into the expansion device, wherein the working fluid is heated by heat from the heat generating source before being supplied to the expansion device; and a generator for generating an electric power when the generator is rotated by the driving force generated at the expansion device, wherein the complex fluid machine further comprises;

a housing for housing therein the expansion device, the generator, and the pump;

a partitioning wall for dividing a space defined by the housing into a first space for the expansion device and the generator, and a second space for the pump;

a low pressure port provided at the housing, wherein the low pressure port is in communication with an inside of the first space;

an outlet side passage formed in the first space, through which the working fluid from the expansion device flows to the low pressure port;

an outlet opening provided at the housing, wherein the outlet opening is in communication with an inside of the second space; and a pump outlet-side passage formed in the second space, through which the working fluid from the pump flows to the outlet opening, wherein the outlet side passage formed in the first space and the pump outlet-side passage are respectively formed at each side of the partitioning wall, so that heat of the working fluid in the outlet side passage formed in the first space is transferred to the working fluid in the pump outlet-side passage via the partitioning wall to increase the temperature of the working fluid in the pump outlet-side passage.

2. A complex fluid machine according to claim 1, wherein the housing comprises a motor housing for accommodating the generator, a casing is formed at an outer peripheral portion of the motor housing, an inverter for controlling the operation of the generator is accommodated in the casing such that switching devices of the inverter are arranged at such portion close to the pump outlet-side passage, wherein a part of the pump outlet-side passage extends between the motor housing and the inverter.

3. A complex fluid machine according to claim 1, wherein the housing comprises a pump housing arranged in the second space, which works as a high pressure chamber for the working fluid pumped out from the pump so that the second space is filled with high pressure working fluid.

4. A complex fluid machine according to claim 1, wherein the outlet side passage is formed into a circular shape at one side of the partitioning wall, and the pump outlet-side passage is formed into a circular shape at the other side of the partitioning wall.

5. A complex fluid machine according to claim 4, wherein fins are formed with the partitioning wall and arranged in the first space, and the fins are formed into a circular shape.

6. A complex fluid machine according to claim 1, wherein the housing comprises multiple housing parts, an end housing part and a pump housing part form a pump housing for defining therein the second space together with the partitioning wall, an inlet opening is formed in the end housing part, through which the working fluid is sucked into the pump, the outlet opening is formed in the pump housing part, and a heat insulating member is provided between the end housing part and the pump housing part, so that heat transfer from the working fluid flowing through the pump outlet-side passage to the working fluid flowing through the inlet opening is suppressed.

* * * * *